(12) United States Patent
Turqueti et al.

(10) Patent No.: US 9,084,057 B2
(45) Date of Patent: Jul. 14, 2015

(54) COMPACT ACOUSTIC MIRROR ARRAY SYSTEM AND METHOD

(71) Applicants: Marcos de Azambuja Turqueti, Vista, CA (US); Guilherme Cardoso, Carlsbad, CA (US)

(72) Inventors: Marcos de Azambuja Turqueti, Vista, CA (US); Guilherme Cardoso, Carlsbad, CA (US)

( * ) Notice: Subject to any disclaimer, the term of this patent is extended or adjusted under 35 U.S.C. 154(b) by 137 days.

(21) Appl. No.: 13/656,572

(22) Filed: Oct. 19, 2012

(65) Prior Publication Data

US 2013/0100233 A1 Apr. 25, 2013

Related U.S. Application Data

(60) Provisional application No. 61/549,153, filed on Oct. 19, 2011.

(51) Int. Cl.
| | |
|---|---|
| *H04R 1/32* | (2006.01) |
| *H04W 88/02* | (2009.01) |
| *H04M 1/03* | (2006.01) |
| *H04R 1/34* | (2006.01) |
| *H04R 1/40* | (2006.01) |
| *H04N 7/15* | (2006.01) |

(52) U.S. Cl.
CPC ............... *H04R 1/326* (2013.01); *H04M 1/035* (2013.01); *H04R 1/342* (2013.01); *H04R 1/406* (2013.01); *H04W 88/02* (2013.01); *H04N 7/15* (2013.01); *H04R 2410/07* (2013.01)

(58) Field of Classification Search
CPC ............ H01R 1/32; H01R 1/326; H01R 1/34; H01R 1/342; H01R 1/406; H01R 3/005; H01R 5/027; H01R 2201/003; H01R 2201/40; H01R 2201/401; H01R 2203/12; H01R 2430/20; H01R 2430/23; H01R 2430/25
USPC ............ 381/160, 92, 356, 333, 335, 336, 91, 381/357, 358, 365, 182; 343/878, 912
See application file for complete search history.

(56) References Cited

U.S. PATENT DOCUMENTS

| | | | | | |
|---|---|---|---|---|---|
| 1,786,859 | A | * | 12/1930 | Merrill | 181/125 |
| 2,228,024 | A | * | 1/1941 | Abrahams | 181/125 |
| 3,305,043 | A | * | 2/1967 | Pfund et al. | 181/128 |
| 3,895,188 | A | * | 7/1975 | Ingraham | 381/160 |
| 3,908,095 | A | * | 9/1975 | Jinsenji | 360/55 |
| 4,868,682 | A | * | 9/1989 | Shimizu et al. | 386/324 |

(Continued)

OTHER PUBLICATIONS

Krasnenko et al., "Directed Microphone for Long-Range Acoustic Communication in the Atmosphere", Tomsk State University of Control Systems and Radio Electronics, XVIII Session of the Russian Acoustical Society, Taganrog, Russia, Sep. 11-15, 2006.*

*Primary Examiner* — Curtis Kuntz
*Assistant Examiner* — Joshua A Kaufman (57) ABSTRACT

A microphoning assembly having a plurality of individual, sound directing, substantially parabolic structures are adjacently arranged to form a single structured acoustic, hemispherically directed array. The parabolic structures' absorption factor is less than 0.3. MEMS microphones of less than 2 mm in size are situated at each focus to pick up sound reflected from the parabolic structures, wherein a 10 dB gain is experienced. A microprocessor, a signal conditioning module, and an analog-to-digital converter is embedded in the array. The microprocessor contains instructions to perform a statistical analysis of among random variables to automatically separate sound sources received by the microphones and automatically determine a distance and direction of a source of the incoming sound.

19 Claims, 9 Drawing Sheets

(56) References Cited

U.S. PATENT DOCUMENTS

| | | | |
|---|---|---|---|
| 4,907,671 A * | 3/1990 | Wiley | 181/155 |
| 5,075,680 A * | 12/1991 | Dabbs | 342/52 |
| 6,469,732 B1 * | 10/2002 | Chang et al. | 348/14.08 |
| 6,774,934 B1 * | 8/2004 | Belt et al. | 348/211.1 |
| 6,922,206 B2 * | 7/2005 | Chu et al. | 348/14.09 |
| 6,980,485 B2 * | 12/2005 | McCaskill | 367/119 |
| 7,015,954 B1 * | 3/2006 | Foote et al. | 348/218.1 |
| 2003/0118200 A1 * | 6/2003 | Beaucoup et al. | 381/110 |
| 2004/0114778 A1 * | 6/2004 | Gobeli et al. | 381/356 |
| 2007/0183607 A1 * | 8/2007 | Andrews et al. | 381/160 |
| 2008/0180675 A1 * | 7/2008 | Sheen et al. | 356/437 |
| 2008/0302599 A1 * | 12/2008 | Zou | 181/290 |
| 2012/0120270 A1 * | 5/2012 | Li et al. | 348/222.1 |
| 2012/0281854 A1 * | 11/2012 | Ishibashi et al. | 381/92 |
| 2012/0288114 A1 * | 11/2012 | Duraiswami et al. | 381/92 |
| 2013/0100233 A1 * | 4/2013 | Turqueti et al. | 348/14.02 |
| 2013/0147835 A1 * | 6/2013 | Lee et al. | 345/629 |

\* cited by examiner

RELATED ART

COMPACT ACOUSTIC MIRROR ARRAY SYSTEM AND METHOD

CROSS-REFERENCE TO RELATED APPLICATIONS

This application claims the benefit of U.S. Provisional Patent Application No. 61/549,153, titled "Compact Acoustic Mirror Array System and Method," filed Oct. 19, 2011, the contents of which are hereby incorporated by reference in its entirety.

FIELD

The present disclosure is in the field of sound systems.

BACKGROUND

Microphone or sound detecting systems typically comprise a single microphone physically encased in an isotropic material (e.g., wood or plastic) with an open aperture for omnidirectional or for hemispherical sensitivity. Consequently, the bulk of improvements in modern microphoning technology have primarily been directed to developing better microphonic circuits (e.g., amplifiers, signal processing) or to better microphonic hardware (e.g., piezoelectrics or electromagnetic microphones). Accordingly, there has not been any significant advancement in the use and configuration of specialized materials for the microphone casing or for lensing/amplifying effects.

Therefore, there has been a long-standing need in the sound and microphoning community for new methods and systems that address these and other deficiencies, as further detailed below.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a microphoning assembly is provided, comprising: a sound directing structure having an acoustic focus, a portion of the structure having a sound-affecting physical property that that directs a wave front of incoming sound to the focus; and a microphone situated substantially proximate to the focus to pick up the directed sound, wherein an increase of at least 10 dB is experienced at the microphone as compared to non-directed sound.

In another aspect of the disclosed embodiments, a method of enhancing the detection of sound is provided, comprising: forming a sound directing structure having an acoustic focus, a portion of the structure having a sound-affecting physical property that that directs a wave front of incoming sound to the focus; and situating a microphone substantially proximate to the focus to pick up the directed sound, wherein an increase of at least 10 dB is experienced at the microphone as compared to non-directed sound.

DETAILED DESCRIPTION

Acoustic metamaterials is a term used to describe materials having the ability to control, direct, and manipulate acoustic energy. Metamaterials offer unique features in that they can be designed to be frequency sensitive, as well as "directionally" sensitive, having a given acoustic property in one direction while having a different acoustic property in another direction, as well as varying along a given direction.

Based on the type of material used, the variation of material thickness, shape, location, orientation, refractive index, density, and so forth, the metamaterial can be tailored to have an acoustic refractive index $\eta$ that is negative or double-negative. The ability to have a negative refractive index $\eta$ suggests that they can be designed with a spatially varying index of refraction to bend the sound waves that are traveling "through" the metamaterial—similar to an optical lens—to form a focusing/amplifying acoustic lens. Reference is made to Hisham Assi's paper in Medical Imaging, titled "Acoustic Metamaterials: Theory and Potential Applications," found on www.mendeley.com as Issue: 993444251 (JEB1433: Medical Imaging), which provides a thorough overview of acoustic metamaterials. Of course, in addition to focusing acoustic energy, defocusing/attenuating of acoustic energy can also be considered.

Aside from materials having an exotic physical composition, metamaterials can be formed from a standard material, but tailored or shaped in a unique way. As one non-limiting example, a homogeneous material can be formed into a series of multi-sized chambers or lattices which operate to "trap" sound as it bounces between the walls of the chambers/lattices. Therefore, an array of frequency sensitive, sound deadening chambers or channels can be developed from a "normal" material to provide extraordinary sound absorption capabilities (as one possible example) within a framework that is several orders of size smaller than previously considered possible.

For purposes of simplicity in this disclosure, the use of the term "metamaterial" will be generally understood to encompass frequency-affecting, directionally sensitive materials or, as where appropriate, materials that exhibit an acoustic refractive index that is negative or double-negative. In some instances, the topic will lend itself to indicate that the metamaterial possesses both a sound-affecting directional characteristic and a negative (or double-negative) refractive index.

Figure 1:
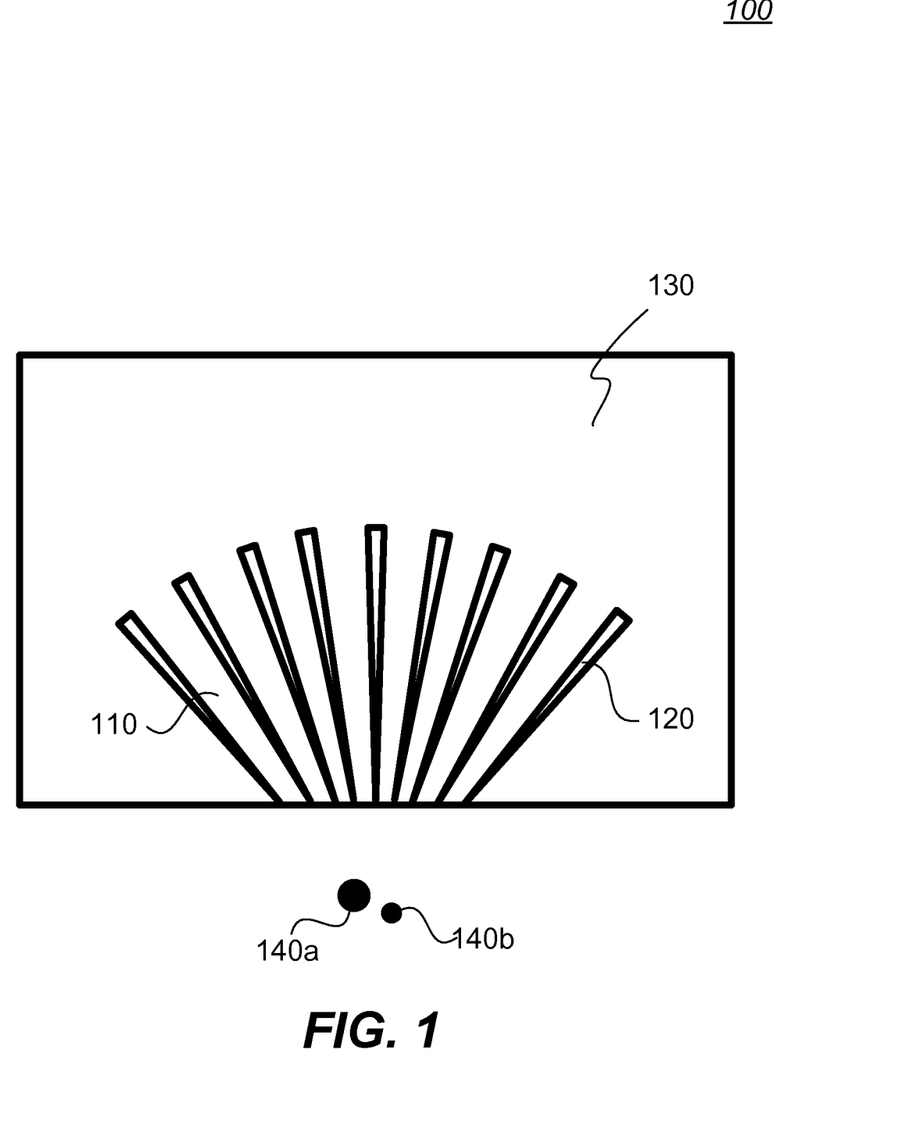
FIG. 1 is an illustration of a related art sound array.

An example of an acoustic lens is found in FIG. 1 which is an illustration of a related art sound array 100, as described in IEEE Spectrums' Biomedical Imaging News, October 2009 by Prachi Patel, titled "Acoustic Hyperlens Could Sharpen Ultrasound Imaging." An array of brass fins 110 are situated on top of and on a brass plate 130, radiating outward from focus 140. The sound array 100 is capable of distinguishing multiple "nearly" co-located sound sources 140a, 140b at the "focus" of brass fins 110 having a resolution of less than one-seventh the sound signal's wavelength. In one example, multiple sound sources (4.2 and 7 kiloHertz) that are separated by only 1.2 centimeters from each other, were detected as being physically separated.

As detailed below, various exemplary embodiments can utilize a metamaterial that provides a lensing (negative refractive index) capability. Therefore, "manipulation" of the direction of sound can be exploited to concentrate and enhance the sound to a microphone(s), while providing a physically protective covering. For example, an encapsulated microphone can be developed with a metamaterial casing—the sound being "channeled" directly to the front of the microphone via use of negative (or double negative) metamaterials. In other embodiments, various combinations of metamaterials and arrangements of microphones can be devised to provide unique capabilities, such as for example, direction-finding, sound discrimination, and so forth.

In various other embodiments, a non-metamaterial is configured to provide results that are similar to "lensing" effects produced by a metamaterial. For example, a "backside" casing/surrounding can be designed as a sound reflecting mirror capable of concentrating sound to the microphone which is placed in the vicinity of the mirror's focal point(s). With an array of such embodiments, increased sensitivity and directionality capabilities can be obtained. For example, high accuracy direction finding, enhanced detection, higher off-axis isolation, and other features, can be obtained.

In one exemplary embodiment, a tri-axial acoustic sensor can be developed for detecting, localizing, and identifying sources of sound that are an extended distance away. In another exemplary embodiment, the ability to operate in high noise environments, including discriminating high intensity sounds from specific directions can be obtained. In yet another embodiment, an exemplary system can operate through high persistent background noise. The details of these and various other embodiments are disclosed below.

Figure 2A:
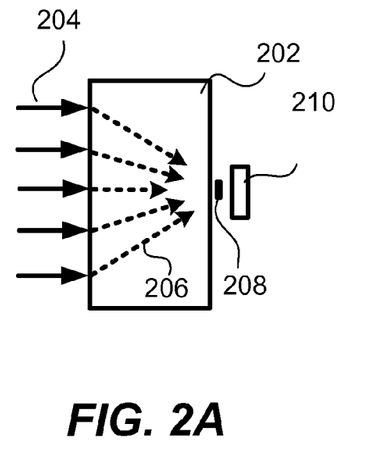
FIGS. 2A-D are illustrations of exemplary sound focusing systems and a description of defining elements for a parabola.
Figure 2B:
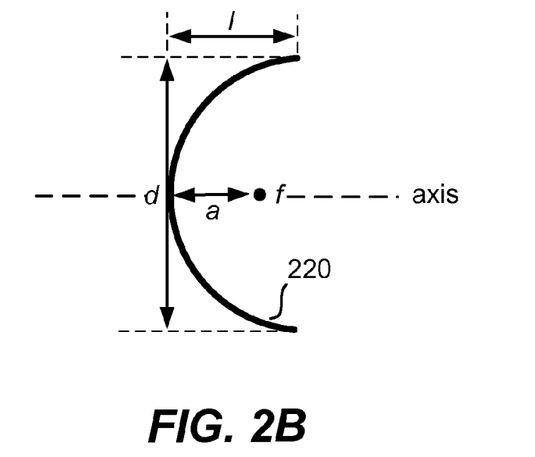
Figure 2C:
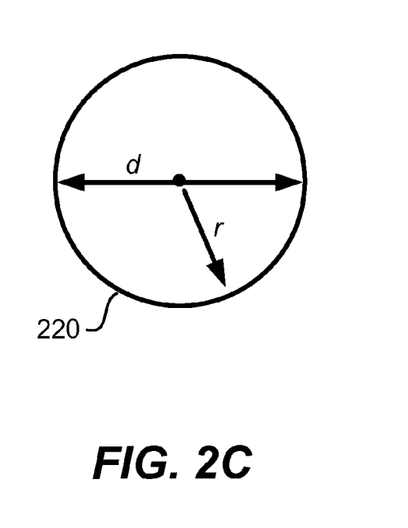
Figure 2D:
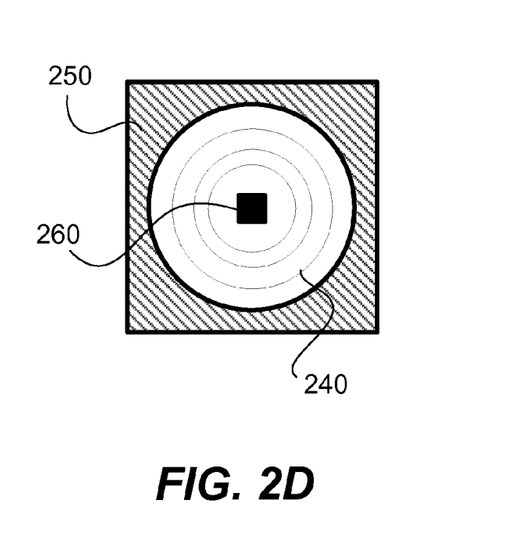

FIGS. 2A and 2D are illustrations of exemplary sound focusing systems. FIG. 2A is a cross-sectional view of a lensing metamaterial 202 that operates to concentrate incoming sounds 204 by "bending" 206 the sound within the metamaterial 202. The result is that sound upstream from the microphone 208 is now concentrated ("focused") to microphone 208. Analogy is made to the acoustic lens of FIG. 1. An optional sound diffuser 210 is shown "behind" or downstream from the microphone 208 to prevent sound arriving from the right side of the diagram from being picked up by microphone 208. Upon careful examination of FIG. 2A, it can be seen that it has a similar functionality to that of a reversed parabolic reflector.

FIGS. 2B-C are illustrations showing standard defining elements for a parabola 220: distance of vertex from plane of mouth (l), diameter (d), distance (a) from focus (f) to parabola's surface, radius (r). Because this kind of parabola 220 focuses only incoming waves parallel to the axis, this parabola 220 is very directional.

When talking about acoustic waves, the wavelength (λ) of the incoming waves also matters. Equations [1] and [2] describe the amplification factor ($F_p$) on the parabola's focus f depending on its geometry and on the wavelength (λ) of the incoming acoustic wave.

$$F_p = \left|\frac{p_f}{p_i}\right|. \tag{1}$$

$$F_p = \left\{1 + \left[4\pi\frac{a}{\lambda}\ln\left(1+\frac{l}{a}\right)\right]^2 + 8\pi\frac{a}{\lambda}\ln\left(1+\frac{l}{a}\right)\sin 4\pi\frac{a}{\lambda}\right\}^{\frac{1}{2}}. \tag{2}$$

As expressed by Equation 1, the amplification factor ($F_p$) is defined by taking the ratio of the incoming wave in the focus of the parabola ($p_f$) to the pressure of the same wave at the mouth of the parabola ($p_i$). The determination of this rate in terms of a parabola's parameters and wavelength (λ) of the incoming wave is given by Equation 2. It is interesting to note that Equation 2 does not require knowledge of the diameter (d).

With respect to the material forming the parabola, a perfect acoustic reflector having an absorption factor of zero would be desirable (i.e., all sound energy is one hundred percent reflected by the parabola's surface—if such a material existed). However, in general, any material with a relatively low absorption factor can be used as a parabolic reflector due to the fact that any loss caused by the material absorption is negligible when compared to the amplification factor of the parabola. The absorption factor is a function of the material density, its thickness, and the wavelength of the incoming acoustic wave, and is "negligible" if it is smaller than approximately 0.3 for frequencies of interest, in the particular experimental models made by the inventors. Of course, depending on the amplification factor in a particular design, the absorption factor "threshold" may need to be higher.

For normal hearing frequency ranges, one of many possible materials having an absorption factor close to 0.3 is Acrylonitrile Butadiene Styrene (ABS). Using a 3D printer with ABS, the inventors were able to build experimental reflectors with tested results that were less than 2 dB from theoretical calculations (it is noted that the theoretical calculations did not include absorption factor losses, therefore, if accounting for absorption factor losses, the experimental results would be very accurate). Therefore, plastics or polymers are examples of several non-limiting materials that can be used in the exemplary embodiments.

FIG. 2D is an exemplary parabolic reflector 240 built into a non-metamaterial, low absorption factor substrate 250 with a microphone 260 located at the reflector's focus pointing towards the substrate surface. The microphone 260 should be of a form factor that is small enough to fit within reflector 240 without interfering with the incoming sound. In experimental models fabricated by the inventors, MEM microphones from Akustica and Knowles, having dimensions of approximately 2 mm or less, were used with good results. Of course, other types and sizes of microphones may be used, according to design preference.

FIG. 2D is provided to demonstrate one of many possible form factors that was experimentally fabricated and tested, as proof of concept. Accordingly, the parabolic reflector 240 can be elliptical in form, or even multi-faceted—being a low order approximation of a smooth curvature. Therefore, various curvatures that are non-parabolic can be utilized, recognizing that the "amplifying" effect of the curvature (or approximation thereto) should take into account the absorption factor of the underlying substrate. Though not shown, the microphone 260 can be formed from several discrete microphones and may be positioned at different places about the face of the reflector, enabling direction information to be obtained, as well as possible phasing information.

In one experimental model fabricated by the inventors, the exemplary parabolic reflector (or acoustic mirror) had an a=0.5 cm and l=0.5 cm. This model performed better than conventional microphones for frequencies between 4 kHz to 11 KHz and for ranges of less than 500 meters. However, according to theoretical simulations, a vastly superior acoustic mirror (approximately a 25 dB gain over most of the frequency range) can be obtained by simply changing the dimensions to a=1.5 cm and l=6.0 cm. Thus, by increasing the relative size of the acoustic mirror, a surprisingly high amount of gain can be obtained, without having to alter any electrical hardware or perform any signal processing modifications. It is noted that the sizes described for the experimental models were less than several inches in size. Therefore, extremely "sensitive" microphoning systems can be manufactured with an overall form factor that is only inches in size. This form factor, of course, is several orders of magnitude smaller than typical systems utilized in industry.

One benefit that was discovered was that since the underlying microphone is situated with its sensor side facing the substrate's surface (i.e., inward), the exemplary acoustic mirror is relatively insensitive to wind effects. Wind pressure immunity arises from the fact that the "back side" of the microphone is affected by the wind, but the sensor-side of the microphone is not affected by the wind. Experiments have shown winds of up to 12 km/hr. had no discernable effect on the performance of the exemplary acoustic mirror. Notwithstanding the above, in some cases is may be desirable to have a windscreen to obstruct rain as well as for high winds.

Figure 3A:
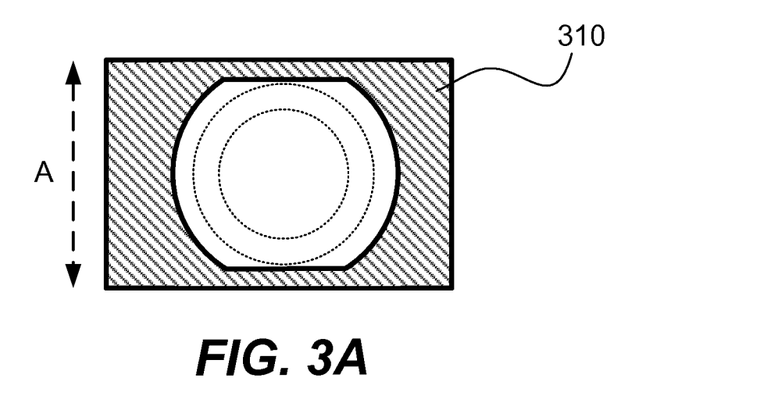
FIGS. 3A-C are illustrations showing various exemplary acoustic mirror embodiments with progressively reduced heights.
Figure 3B:
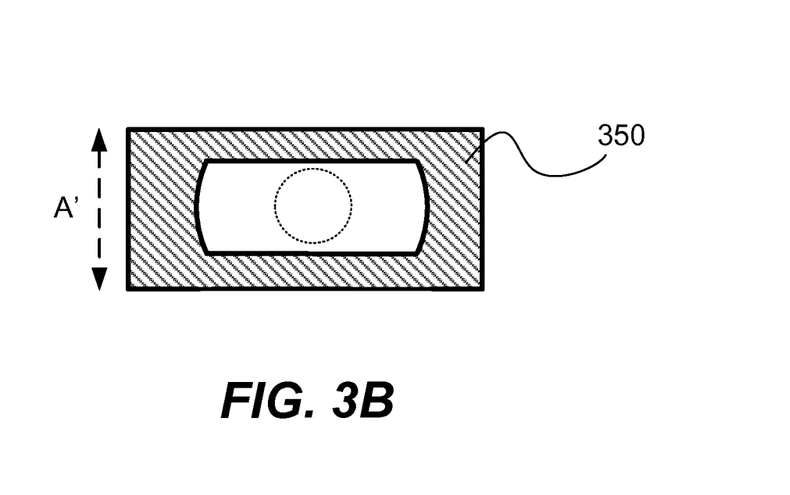
Figure 3C:
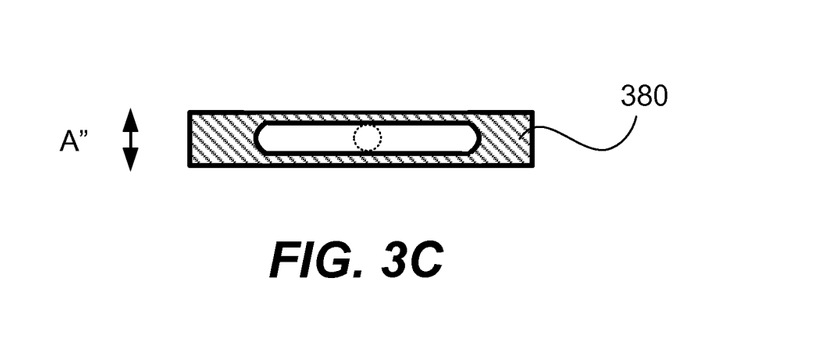

FIGS. 3A-C are illustrations showing various exemplary acoustic mirror embodiments (shown without microphones) where the height of the acoustic mirror is progressively reduced. For example, in FIG. 3A the acoustic mirror 310's height A is such that a small portion of top and lower sections of the acoustic mirror 310 is truncated. The truncation results in a reduction in elevation range amplification. The increasing reduction in height (A'–A") is shown in the acoustic mirrors 350 and 380 of FIGS. 3B-C, respectively. As noted above, the truncation in the vertical direction reduces elevation range amplification, however, depending on the use of the acoustic mirror, the reduction of elevation range amplification may not be of any significance. For example, for a horizontally-directed microphone system (with wide azimuthal coverage), the exemplary embodiment of FIG. 3C would be a suitable configuration.

Figure 4A:
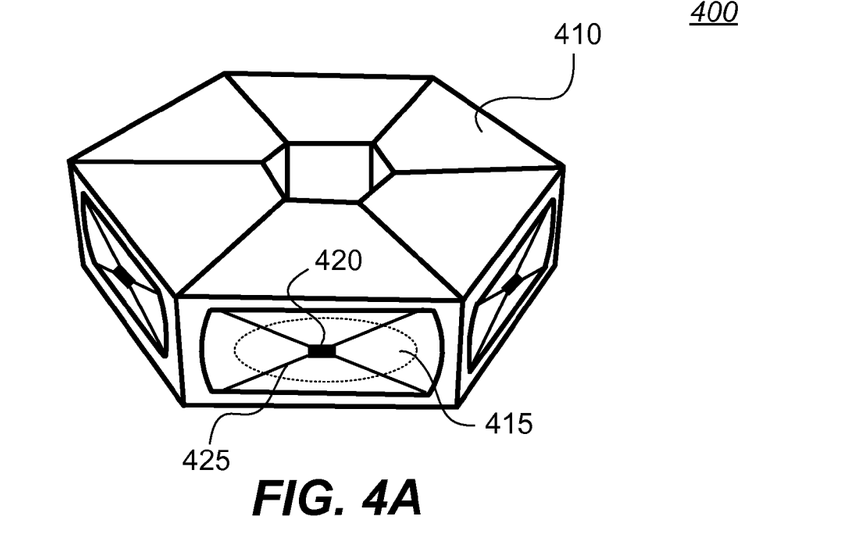
FIGS. 4A-B are illustrations of exemplary acoustic arrays.
Figure 4B:
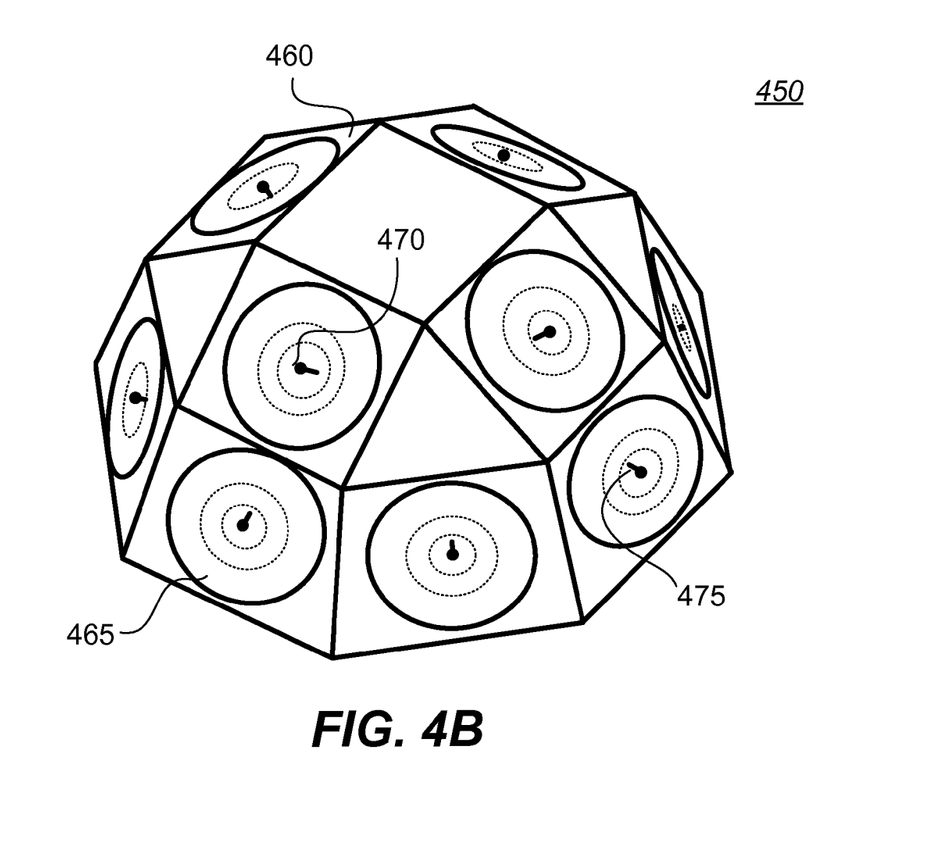

FIGS. 4A-B are illustrations of acoustic arrays built from concepts introduced above. For example, FIG. 4A is an azimuthal array 400 comprised of six horizontally arranged low elevation angle acoustic mirror modules 410. Microphones 420 are disposed at the focal point (or approximately thereto) of the respective focusing cavity 415, being supported by wires 425 or some other mechanical structure. In some of the experimental models that were fabricated, plasticized floss was used to support the microphones 420. FIG. 4A demonstrates one exemplary embodiment 410 where three-hundred-sixty degrees of horizontal (azimuthal) coverage is provided by six radially arranged acoustic mirror modules 410. Of course, depending on the physical size of the acoustic mirror modules 410, more or less mirrors may be used, affecting the "granularity" of the coverage.

FIG. 4B is an illustration of an exemplary hemispherically arranged array 450 that provides hemispherical coverage. With a vertical arrangement of the acoustic mirror modules 460, elevation sensitivity/amplification can be exploited in this exemplary embodiment. Since the focusing cavity 465 is relatively circular-in-shape, each acoustic mirror module 460 will also have broader elevation capabilities than its counterpart in FIG. 4A. The combination of vertical and horizontal arrangement provides three-hundred sixty degrees of horizontal (azimuthal) and one-hundred-eighty degrees of vertical (elevation) coverage. Microphones 470 are shown here as being supported by supporting arm 475. Wiring from the microphone 470 to a processor (not shown) can be facilitated via the supporting arm 475. In a simulated model, the exemplary array 450 was configured to have a maximum size of less than 11 cm and a maximum width of less than 27 cm. Of course, depending on design preference, the actual size may vary.

Figure 5A:
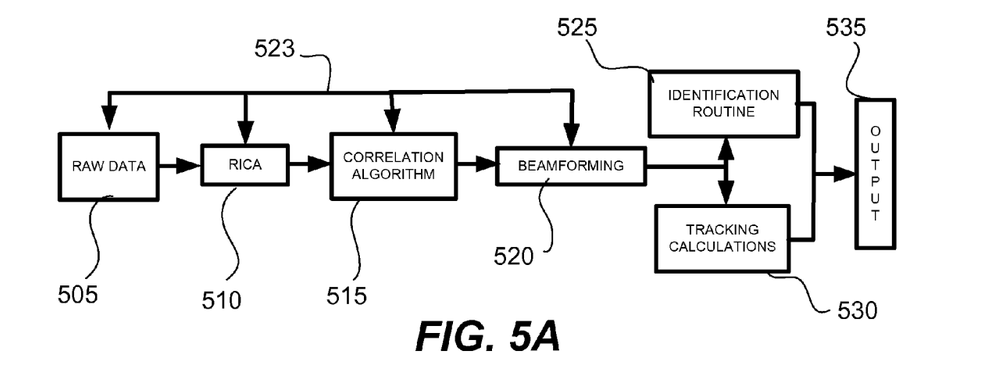
FIGS. 5A-C are block and system diagrams illustrating exemplary processes, hardware and resolution for an exemplary acoustic mirror array.

FIG. 5A is a block diagram illustrating an exemplary process for resolving data received from an exemplary acoustic mirror array to extract information on the sound source(s). This particular process is tailored for multiple sources that are moving and provides tracking and identification information. Depending on the implementation scenario, various features shown herein may not be necessary. In operation, raw data 505 from the microphone/acoustic mirror(s) is input into a real-time independent component analysis (RICA) algorithm 510 to extract hidden parameters (a statistical analysis is performed among random variables). Specifics for this algorithm 510 and for signal processing are known in the art and also provided in an inventor's Ph.D thesis titled "Acoustic MEMS Array Embedded in a Scalable Real-Time Data Acquisition and Signal Processing Platform" by Marcos Turqueti, July 2010, Illinois Institute of Technology, Chicago, Ill., the contents of which are expressly incorporated herein by reference in its entirety.

The RICA algorithm 510 separates multiple sound sources, provides location and heading of the sources, and identifies the source(s) if the same is part of an algorithm library. Next, a correlation algorithm 515 may be utilized to determine what the found parameters map to. Next, beam forming 520 information is extracted to determine where the source(s) is located. Each of the modules 505, 510, 515, and 520 may have feedback loops 523 to allow information to be exchanged. Steps 525 and 530 correspond to identification and tracking routines (e.g., a sound may have the signature of an car having a known maximum speed, which can be used to determine the range of possible distances—i.e., tracking—within a given time frame). Information obtained from modules 525 and 530 can be output 535 and utilized as needed. Depending on the type of information desired, calculation using phase difference, Doppler Effect, and sound intensity may be utilized. As noted above, various particulars of the algorithms to arrive at the desired information is known in the art are understood to be within the purview of one of ordinary skill in the art. By use of these and other algorithms, sound discrimination, amplification, identification, background noise reduction, distance gauging, movement, and other forms of information can be acquired.

Figure 5B:
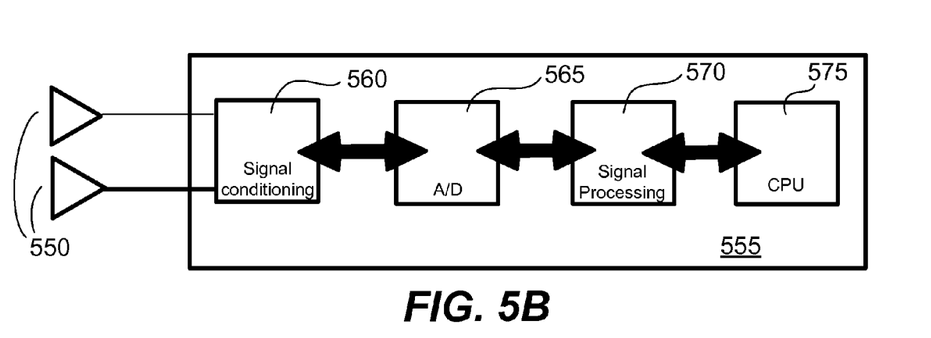

FIG. 5B is a high level hardware block diagram illustrating circuitry type that may suitable for use in the exemplary embodiments, wherein the power supply/feeds (not shown) are understood to be implicit. In operation, signals from microphones 550 are fed into a processing platform 555 which contains one or more components, such as signal conditioning hardware 550; analog-to-digital (A/D) convertor 565; signal processor 570; and CPU 575 for analysis and control. Aspects of FIG. 5A may be implemented in the hardware described herein. Of course, since FIG. 5B is a high level hardware diagram, additional hardware elements and arrangements thereof may be contemplated without departing from the spirit and scope of this disclosure. For example, multiple CPU's may be utilized or the signal processing and CPU modules (570 & 575) may be combined into a single hardware chip, or additional memory or communication hardware may be utilized. In some more modern hardware systems, all of the processing platform 555's modules or functions may be achieved by a single ASIC chip.

Figure 5C:
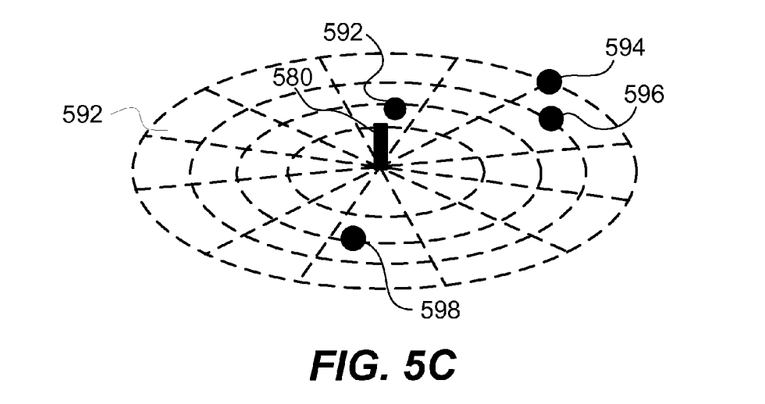

FIG. 5C is a two-dimensional illustration of an exemplary acoustic mirror array 580 centered within a polar reference frame 590. In particular, using the procedures described above, the exemplary acoustic mirror array 580 is shown as resolving the azimuthal direction and distances of sound sources 592, 594, 596 and 598 about the polar reference frame 590. Inventors have experimentally demonstrated this capability as applied to determining the direction, location and speed of numerous airplanes en route to a local airport.

Figure 6A:
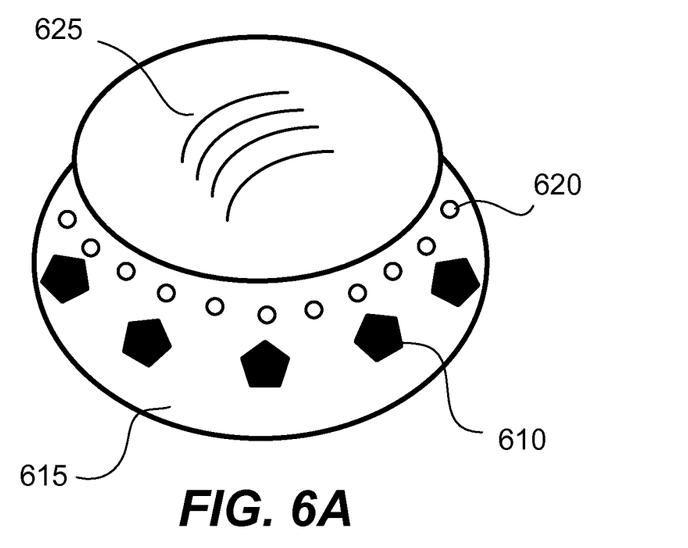
FIGS. 6A-B are perspective illustrations of acoustic mirror arrays embedded in commercial shapes.
Figure 6B:
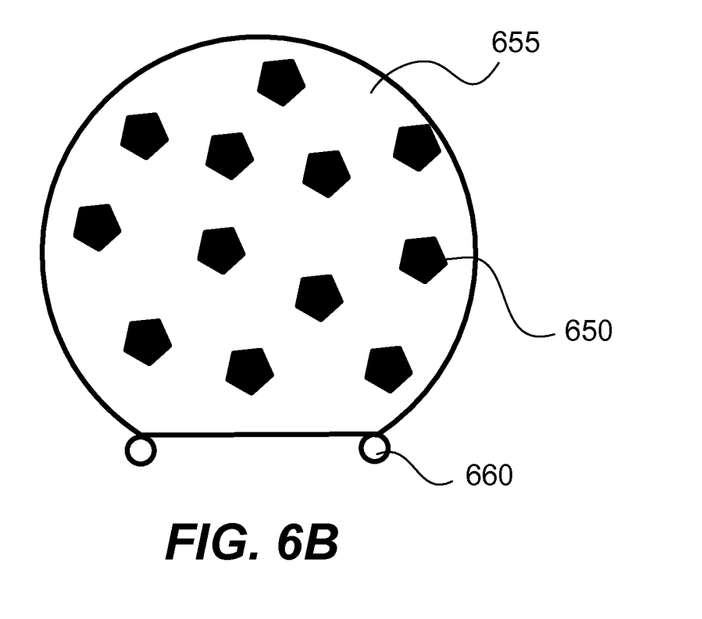

FIGS. 6A-B are perspective illustrations of possible acoustic mirror arrays embedded in a "commercial" form factor. FIG. 6A illustrates one possible configuration where individual acoustic mirrors 610 are radially embedded in housing 615, to provide azimuthal coverage. For convenience, LED's or light indicators 620 may be displaced around the housing 615, to indicate when and in which direction a sound is detected, and/or to indicate a status of operation (e.g., on/off, detected sound amplitude, etc.). In some modes of operation, it is conceived that certain of the light indicators 615 may be supplemented with switches, which turn off or on respective acoustic mirrors 610, thus allowing the exemplary embodiment to "filter out" or ignore sounds originating from a particular direction. Speaker 625 may be situated at the top of housing 615 (or bottom or other location) to avoid interfering with acoustic mirrors 610. It should be apparent that the configuration of FIG. 6A is well suited to a conference room microphone/speaker system, much akin to the well-known PolyComm® systems (of the PolyComm company).

FIG. 6B is a modification of the system shown in FIG. 6A, wherein the acoustic mirrors 650 are hemispherically arranged around housing 655 to provide hemispherical coverage. Speaker (not shown) may be placed at the bottom of housing 655, being separated from a supporting surface (e.g., table top) by legs 660. Lights or other forms of visual indicators (not shown) may be situated about the housing 655 as needed.

Figure 7A:
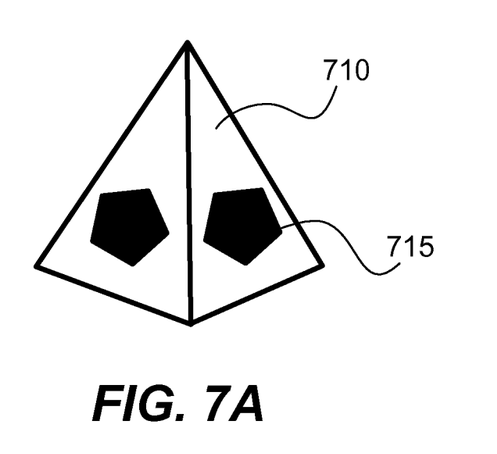
FIGS. 7A-C are other exemplary embodiments in commercial shapes.
Figure 7B:
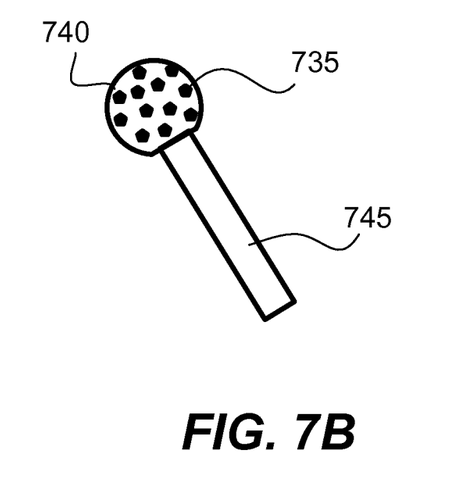
Figure 7C:
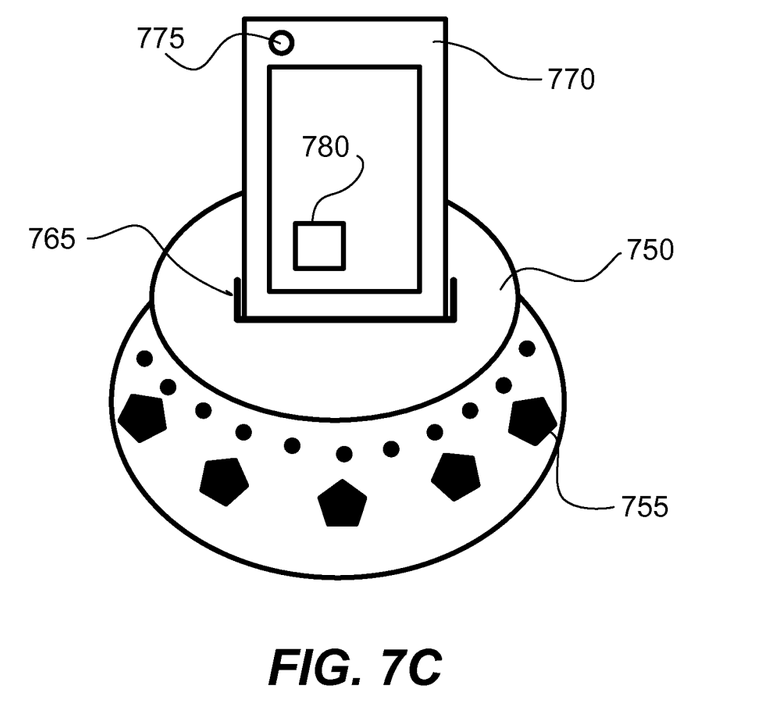

FIGS. 7A-C are other exemplary embodiments in commercial form factors. For example, FIG. 7A shows a triangular-like housing 710 where acoustic mirrors 715 are placed in the respective facet surfaces. FIG. 7B is an illustration of acoustic mirrors 735 supported by housing 740 in a typical stage microphone 745. This embodiment utilizes the possibility to phase isolate sound from a preferred direction. That is, the embodiment of FIG. 7B may be configured to have a higher sensitivity in a particular direction while being insensitive to sounds in another direction. The ability to phase direct (control direction and sensitivity) is a well-known concept, wherein in this exemplary embodiment may provide new capabilities in stage microphones that have not before been possible due to the physical hardware limitations of prior art microphones.

FIG. 7C is an exemplary embodiment that marries the embodiment of FIG. 6A with a smart phone 770 for video conferencing. In this scenario, use of the smart phone's camera 775 (or rear camera—obscured from view) may be used to facilitate video communication. In particular, the smart phone 770 can be plugged into receptacle 765, utilizing the acoustic mirrors 755 as microphone sources. An application 780 on the smart phone 770 (or remotely operated application) can facilitate the video conferencing operation. For example, it is conceived that an individual facing the front of the smart phone 770 may speak—triggering the application 780 to turn on front camera 775 (or zoom in to the speaker) to feature the speaker.

Similarly, it is conceived that the front camera 775 may cover the full field of view for the "front" of the smart phone 770, wherein there may be several attendees located around the front of the smart phone 770, each having a respective acoustic mirror 755 approximately directed in their direction. As one of the attendees speaks, the respective acoustic mirror 755 (or combination of acoustic mirrors) may "target" that individual and inform the application 780 "where" in the field of view the attendee is speaking from. Then the application 780 can pan to the appropriate area in the front camera's field of view to feature the speaker. Since distance can also be resolved, the appropriate level of "zooming" can be achieved. Similar operations may be implemented to any rear facing camera (not shown) on the opposite side of the smart phone 770. Thus, a single smart phone having both a front and rear camera may provide near 360 degree video conferencing capabilities when tandemed with an exemplary acoustic mirror array.

While FIGS. 6-7 illustrate various commercial embodiments, it should be apparent that based on the capabilities of the acoustic mirror arrays described herein, modifications and changes to the exemplary embodiments may be made without departing from the spirit and scope of this disclosure.

Figure 8:
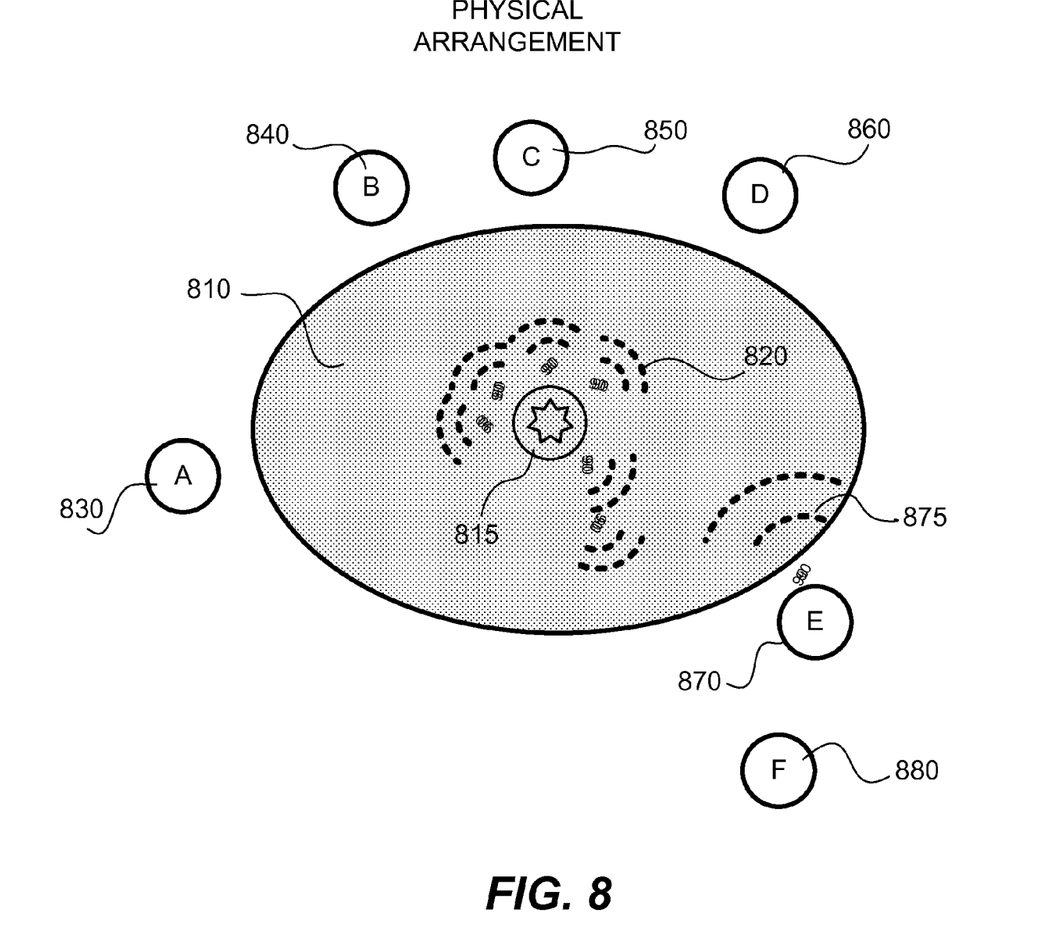
FIG. 8 is a bird's eye view of a video conference call with multiple attendees using an exemplary embodiment.

FIG. 8 is a bird's eye view of a video conference call with multiple attendees (A, B, C, D, E, F) around a table 810. Located on the table 810 is an exemplary acoustic mirror array system 815 designed for video teleconferencing. Attendees 830, 840, 850, 860, 870, and 880 (A, B, C, D, E, and F, respectively) are located at different angular and radial distances from the acoustic mirror array system 815. Dashed lines 820 around the acoustic mirror array system 820 indicate (for reference purposes only) the detected directions of sound from respective attendees. Dashed lines 875 indicates that attendee E (870) is speaking toward attendee D (860).

Figure 9A:
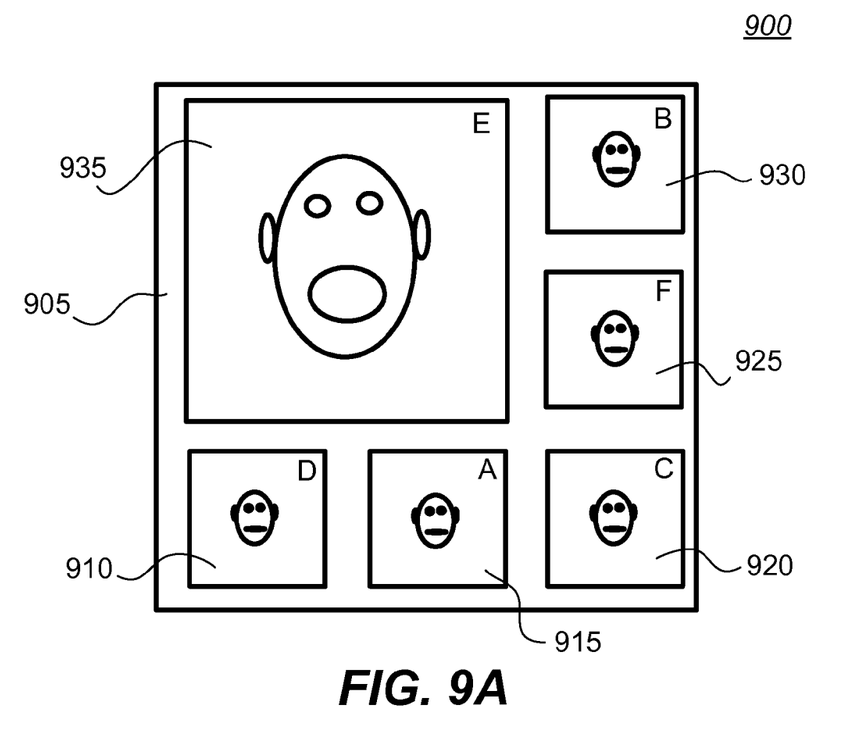
FIGS. 9A-B are illustrations of possible video teleconference displaying arrangements using an exemplary embodiment in the context of FIG. 8.

FIG. 9A is an illustration of one possible video arrangement 900 based on the use of an exemplary acoustic mirror array for the physical arrangement shown in FIG. 8. Video screen 905 contains viewing windows or images of the respective attendees A, B, C, D, E, and F. The arrangement of the attendees within video screen 905 may be random or fixed. In this particular example, attendee E (935) is featured as speaking and as so, his image is enlarged as compared to non-speaking attendees A, B, C, D, and F (910, 915, 920, 925, and 930, respectively).

Figure 9B:
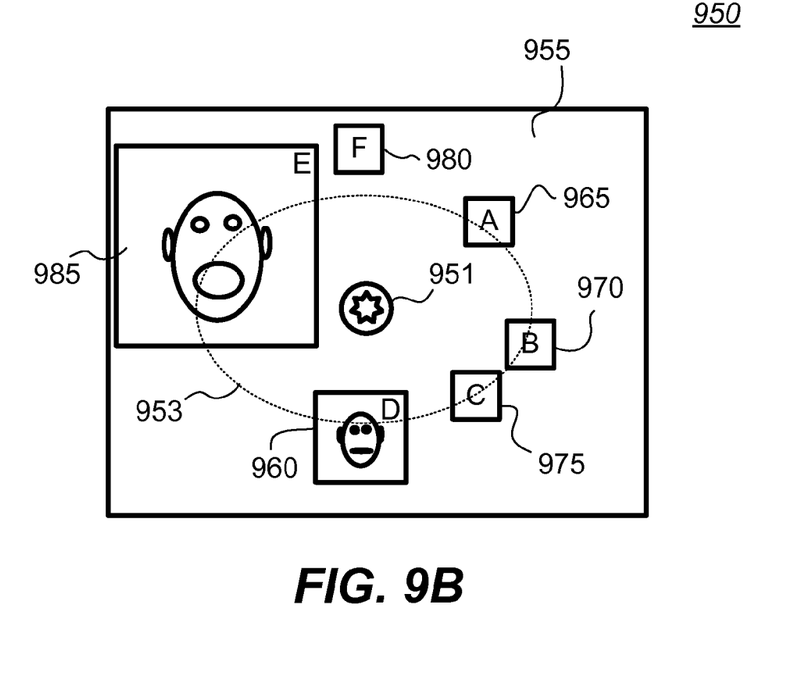

FIG. 9B is an illustration of a video arrangement 950 from the perspective of attendee D (960), who is the person attendee E (985) is speaking to. For reference purposes, the table 953 is shown with the other respective attendees (A, B, C, and F—965, 970, 975, and 980, respectively) arranged about the table 953 and in a non-speaking visual mode (reduced image size). It is noteworthy to see that with the exemplary acoustic mirror array 951, it is possible to locate (or visually target) the respective attendees by using speech only as the only referencing mechanism. It should be noted that video screen 955 may be located separate from the exemplary acoustic mirror array 951. For example, laptops or portable screens situated in front of each attendee may be configured to show the video arrangements 900, 950, where the arrangement of 950 is tailored to the physical location of the respective attendee.

It is understood that various modifications may be implemented to improve the usability of a video conferencing solution, as presented in FIGS. 9A-B. For example, detected sound may be filtered or assessed as coming from a human source prior to visual targeting of the sound source. That is, use of an identification routine 525, for example, as shown in FIG. 5A may be utilized to avoid visual targeting of a cough or a chair moving or a personal phone moving. Thus, various sound sources and triggering of the video tracking may be adjusted, according to design preference.

In view of the exemplary embodiments described herein, a new enabling technology is presented that possesses various novel and enabling characteristics not achievable by conventional microphoning systems. It is understood that while what has been described above includes examples of one or more embodiments, it is, of course, not possible to describe every conceivable combination of components or methodologies for purposes of describing the aforementioned embodiments. However, one of ordinary skill in the art may recognize that many further combinations and permutations of various embodiments are possible. Accordingly, the described embodiments are intended to embrace all such alterations, modifications and variations that fall within the spirit and scope of the appended claims.

What is claimed is:

1. A microphoning assembly, comprising:
    a plurality of individual sound directing substantially parabolic structures adjacently arranged to form a single structured, hemispherically directed acoustic array, each parabolic structure having an acoustic focus and composed of a material with an absorption factor of approximately less than 0.3 for frequencies of interest, the parabolic structures directing a wave front of incoming sound to its focus;
    a plurality of MEMS microphones of less than approximately 2 mm in size, each situated proximate to each focus to pick up sound reflected from the parabolic structures, wherein an increase of at least 10 dB is experienced at each microphone as compared to non-directed sound; and
    a microprocessor a signal conditioning module and an analog-to-digital converter embedded in the array, receiving output from the plurality of microphones, the microprocessor containing instructions to perform a statistical analysis of among random variables to automatically separate sound sources received by the microphones and automatically determine a distance and direction of a source of the incoming sound.

2. The microphoning assembly of claim 1, wherein the parabolic structure amplifies the incoming sound by at least 20 dB, as is experienced at the microphone.

3. The microphoning assembly of claim 1, wherein the parabolic shape of each structure is asymmetrical to form a truncated width or truncated height parabolic structure.

4. The microphoning assembly of claim 1, wherein the parabolic structures are formed from a polymer.

5. The microphoning assembly of 1, further comprising a handgrip coupled to a bottom portion of the assembly.

6. The microphoning assembly of claim 1, wherein the array provides at least one of approximately 360 degree azimuthal coverage and approximately 180 degree elevation coverage, without movement of the microphoning assembly or respective parabolic structures.

7. The microphoning assembly of claim 1, wherein the instructions include at least one of a real-time independent component analysis, correlation, phase difference, and Doppler effect algorithm.

8. The microphoning assembly of claim 1, further comprising an indicator light on the array that signals at least one of a status of operation of the microphoning assembly and the determined direction of the incoming sound in reference to hemispherically directed shape of the array.

9. The microphoning assembly of claim 1, further comprising a speaker internal to the array and directing sound in at least one of an upward or downward direction with respect to the array so as to not substantially interfere with the incoming sound.

10. The microphoning assembly of claim 1, further comprising an externally facing receptacle centrally located in the array, for removably inserting a wireless communication device to the microphoning assembly.

11. The microphoning assembly of claim 10, wherein the wireless communication device is a smart phone with at least one camera and is inserted into the receptacle to provide a video-conferencing capability utilizing the smart phone's at least one camera as a video source and the microphoning assembly as an audio source.

12. The microphoning assembly of claim 11, wherein the wireless communication device contains video conferencing application that interfaces with the microphoning assembly, wherein the application controls the at least one camera to automatically zoom to a located sound source that is speaking or generating the most sound as determined by the microphoning assembly.

13. The microphoning assembly of claim 1, further comprising:
    a camera; and
    a video screen, wherein the video screen displays an image from the camera,
    wherein according to the direction of sound detected by the microphoning assembly, a corresponding image is targeted for displaying, thereby enabling automatic visual targeting for display of attendees speaking in a video conference.

14. The microphoning assembly of claim 13, wherein the detected sound is identified as a human voice.

15. The microphoning assembly of claim 13, wherein a portion of the image which is identified as the sound source by the microphoning assemby is targeted for displaying on the video screen.

16. The microphoning assembly of claim 1, wherein the array is less than approximately 11 cm in height and less than approximately 27 cm in width.

17. A method of enhancing the detection of sound, comprising:
    forming a plurality of sound directing substantially parabolic structures, each having an acoustic focus, from a material with an absorption factor of approximately less than 0.3 for frequencies of interest, that directs a wave front of incoming sound to its focus;
    arranging the plurality of structures to form a single structured acoustic array that is hemispherically directed;
    situating a plurality of MEMS microphones of less than approximately 2 mm in size, each proximate to each focus to pick up the sound reflected from the plurality of parabolic structures, wherein an increase of at least 10 dB is experienced at each microphone as compared to non-directed sound;
    automatically signal conditioning an output from the microphones;
    automatically converting the signal conditioned output into a digital signal;
    automatically performing a statistical analysis of among random variables to separate sound sources received by the microphones;
    automatically correlating sound received by the microphones; and automatically determining a distance and direction of a source of the incoming sound.

18. The method of claim 17, further comprising:
positioning a sound blocking structure downstream from the microphones to isolate the microphones from sounds originating downstream from the microphones.

19. The method of claim 17, further comprising:
at least one of identifying a source type of the received sound, tracking movement of the source type, determining an approximate distance of a source of the sound videoing images around the array, and displaying an image corresponding to the direction of the incoming sound.

\* \* \* \* \*